(12) United States Patent
Gibson (10) Patent No.: US 6,198,431 B1
(45) Date of Patent: Mar. 6, 2001

(54) COMPACT GPS TRACKER AND CUSTOMIZED MAPPING SYSTEM

(75) Inventor: James M. Gibson, Vail, CO (US)

(73) Assignee: MapTrek LLC, Vail, CO (US)

( * ) Notice: Subject to any disclaimer, the term of this patent is extended or adjusted under 35 U.S.C. 154(b) by 0 days.

(21) Appl. No.: 09/384,788

(22) Filed: Aug. 27, 1999

Related U.S. Application Data (60) Provisional application No. 60/098,123, filed on Aug. 27, 1998.

(51) Int. Cl.[7] .............................. G01S 5/02; H04B 7/185
(52) U.S. Cl. ............................ 342/357.07; 342/357.13
(58) Field of Search .................. 342/357.08, 357.13, 342/357.07

(56) References Cited

U.S. PATENT DOCUMENTS

| | | | |
|---|---|---|---|
| 5,861,841 | 1/1999 | Gildea | 701/342 |
| 5,883,594 | 3/1999 | Lau | 342/701 |
| 5,889,493 | 3/1999 | Endo | 342/701 |
| 5,902,347 | 5/1999 | Backman | 701/342 |
| 5,987,380 | 11/1999 | Backman | 701/342 |
| 6,002,982 | 12/1999 | Fry | 701/213 |

OTHER PUBLICATIONS

Garmin Aug. 24, 1999 Garmin Cartography Web Site 2 pages attached.
Magellan Aug. 24, 1999 Satelitte Access Tech. Web site 1 page attached.
Depriest Aug. 24, 1999 Magellan v. Garmin Web Site 5 pages attached.
Mehaffey Aug. 24, 1999 Lowrance Global Maps Web site 10 pages attached.

*Primary Examiner*—Thomas H. Tarcza
*Assistant Examiner*—Fred H. Mull
(74) *Attorney, Agent, or Firm*—Oppedahl & Larson LLP (57) ABSTRACT

A light weight compact portable GPS receiver and transmitter for use on the person during outdoor activity, data logging receiver, data logging software supported by battery pack and modified active GPS patch antenna with chips, download connector, download docking station, charging units, mapping software to transfer the GPS data onto various maps including ortho-rectified, flat topographical maps, 3-D projection view topographical maps and street maps.

9 Claims, 8 Drawing Sheets

(4 of 8 Drawing Sheet(s) Filed in Color)

Hoot Gibson
28-Feb-99
Total Vertical Feet 70,065
Peak Speed 45.9 mph, Elapsed Time 6.77 hrs

Hoot Gibson  Total Vertical Feet 70,065
28-Feb-99  Peak Speed 45.9 mph, Elapsed Time 6.77 hrs

Hoot Gibson  Total Vertical Feet 70,065
28-Feb-99   Peak Speed 45.9 mph, Elapsed Time 6.77 hrs

Fig 7

COMPACT GPS TRACKER AND CUSTOMIZED MAPPING SYSTEM

CROSS REFERENCE TO RELATED APPLICATIONS

This application claims the benefit of Provisional Patent Application Ser. No. 60/098,123 filed Aug. 27, 1998, which application is hereby incorporated herein by reference.

BACKGROUND—FIELD OF INVENTION

This invention relates to GPS tracking and customized mapping specifically for use by people outdoors.

BACKGROUND—DESCRIPTION OF PRIOR ART

Modern technology has brought us the ability to monitor and track movements of persons over geographic areas by use of monitoring devices that utilize the Globally Positioned Satellite System or ("GPS"). GPS is a position/navigation system that consists of a constellation of 28 satellites. A GPS receiver is an electronic device that receives signals from the satellites to determine its location on earth, in any weather. GPS has been around since the early 1980s and has been fully operational for many years now.

In any GPS device used by the civilian population corrections are made to adjust the vertical error inherent in the GPS signal. The US government adds a variable to the mix of data transmitted from the satellites so that no one can download immediate precise accurate information. Typically this technology is used by the civilian population in motorized vehicles to assist in determining where that vehicle is located geographically.

Heretofore, GPS tracking has been focused mainly on this use in automobiles and for motorized vehicle travel and many devices have been developed. For example, Kishi, Pat. No. 5,144,318 relates to an apparatus and method for navigating a vehicle using GPS and Ishikawa et.al., Pat. No. 5,657,232 relates to an onboard positioning system. However, such GPS systems are not suitable for use by an individual person when outdoors to display and record their location for either immediate viewing on a map or later printing onto a map of the individuals entire geographic travels. Typically, these vehicle GPS systems are large in size, utilize a motor vehicle's power system and provide a dash board display. Such a system is not compact nor portable for use by an individual on his or her person outdoors.

Correspondingly, there are several GPS devices described as handheld or portable devices for use by a person outside. Odagiri et al., Pat. No. 5,905,460 is a wrist watch type GPS receiver. This is dependent on body movement for activation of the GPS device and may be used to alert a monitoring station of a persons travels outside a restricted area. See also, Woo et al., Pat. No. 5,627,548 navigation wristwear and Layson, Jr., Pat. No. 5,731,757 a portable tracking apparatus for continuous determination of location of criminal offenders and victims. More widely used in the market place are devices from Magellan, Garmin, Lowrance and Trimble describable as handheld display devices programmed by the user as to the identity of their immediate location and updated again by the user as they move geographically. Until recently, these devices limited their mapping to a hand held display of an up loaded map. Now it appears few devices are being used to both up load maps and down load maps with data. However, no device other than this invention interfaces with a mapping system software where three or four dimensional data is displayed on a two dimensional map thereby creating a 3-D enhanced map. See, Eshenbach, U.S. Pat. No 5,798,732 . (See Also, Prior Art Disclosure including Trimble, Garmin, Magellan and Lowrance wet) page excerpts.)

This invention as to its customized mapping system has no prior art. It integrates several technologies to produce a high-resolution topographical map display with very detailed contours, as low as two foot levels, as compared to more normal forty foot mapping onto complicated high-resolution map images. The tracker and mapping system uses software technology that graphs 3-D mapping interfaces to show your true position on a 3-D enhanced projection map or a map that looks like a picture by (1) tying above ground movement to an X-Y coordinate on the ground; (2) adding intelligence to the GPS data to determine the visible location of the X-Y coordinate as printed on the 3-D enhanced projection view and (3) adding special features in the mapping process as true Z-buffering or sorting objects in terms of distance from the eye by displaying the furthest object first and then accurately displaying the corrected raw GPS data as dots or bread crumbs onto the 3-D map model.

SUMMARY INCLUDING OBJECTS AND ADVANTAGES

This inventions unique mapping system and customized software addresses the issues and heretofore unsolved problems of GPS elevation drift in nonobvious ways that is totally surprising and fascinating to all persons skilled in the art of GPS and the field of mapping. For example, prior to my invention, the GPS world has not been able to control the third dimension factor of elevation drift, which can fluctuate from 10 feet to 400 feet. Therefore, this invention, for the first time, permits the accurate display of three-dimensional and four dimensional (including display of time) data onto a two-dimensional map producing what is termed a 3-D enhanced projection map. This invention with its integrated tracking and mapping system now makes it possible to display true geochron data for 3-D viewing.

The problem of elevation drift has been corrected in the mapping system software to anchor the elevation of the person wearing the tracker to the digital elevation model of a mountain or variable terrain model at the user's X-Y location. This method assumes that the user is always on the mountain or terrain surface. In addition, in the skiing application where a skier ascends the mountain via a ski lift he or she is above the ground while on the lift. The software "senses" when the skier is traveling uphill along the trace of a lift line and the software either fails to draw the lift or anchors the skier to the lift line at the chair elevation. This is accomplished by supplying software with a digitized line representing the lift line and its average height, which the software uses to perform a proximity analysis on the skier's position. If the skier is within a certain distance of a known (preprogrammed) lift line and their direction is indicating a sustained upward motion, then the skier is assumed to be riding the lift and their location is snapped to the lift line while their elevation is set to the height of the lift above the surface.

Next the mapping system software takes the GPS raw data recorded as the users location by latitude, longitude and elevation and converts if from what would be a floating way point when attempted to be placed onto a 3-D topographical model or picture map to an accurate display of location.

Further, the inventions unique technique and application addresses the problem of "traveling" waypoints by Z-buffering. The visual representation of a skier's track can be suppressed when he or she is out of sight behind a ridgeline in certain views. Z-buffering is a computer graphics process whereby all objects in a view are sorted by distance to the viewers eye, and the image is built up by rendering the furthest objects (like distant GPS tracks or terrain ridges) first. In this way, since the nearer objects are drawn last, they cover up the farther ones where they should. Because this process uses just simple occlusion, the processing effort to calculate positions of objects is minimized, resulting in faster rendering. The final result is a picture map with accurate GPS waypoints displayed.

By this invention, this unique mapping feature, used to enhance the map product produced through GPS technology, will be available to the consumer either as a daily rental or as a purchased apparatus with mapping software as further described herein. It appears that GPS "techies" are just now using existing GPS trackers such as Garmin, Magellan, Trimble and Lowrance with off the shelf mapping software such as street maps to transfer the GPS data collected by the receiver onto a map displayed either on the hand held unit or a later printed. There does not appear to be specialized or customized mapping system software offered for purchase and use with the "prior art" products.

Even more exciting with this invention, in the very near future by the addition of a transmitter all map views including the 3-D view can be used by a base monitoring station to watch the progress and movements of one or more persons wearing a tracker.

OBJECTS AND ADVANTAGES

It is, therefore, an object of the invention to provide a device, apparatus and method for tracking people in their travels or movements outdoors, record said movements and accurately display these movements onto customized 3-D projection maps or computer displayed maps. The printed maps may be purchased by the person tracked in the event of sports activity as a souvenir as with a daily rental of the tracker, or computer analyzed by a central monitoring station as in search and rescue operations or the like; or used by an individual to determine the location of a person wearing the device at a given point in time or over time. The advantages are as numerous as the mind can imagine. In its skiing application skiers can view their travels for the first time on an accurate display of the mountain terrain skied discovering their total vertical feet skied and speeds obtained. For the outdoor sporting world the sport enthusiast can have a tool to accurately remember their travels whether hiking, biking, skiing or hunting. For the amateur or professional athlete this can be an analytical tool for accessing performance by viewing their travels over terrain in a 3-D model.

With the addition of real time tracking any lost skier wearing a tracker can be located on the tracked mountain or a parent can watch the skiing progress of their family, friends or children while sitting in the comfort of a ski lodge. In other applications, the movement and travels of employees or persons under surveillance can be viewed for monthly reviews of compliance standards or to reveal and prove the tracked person's exact location at a given time and date. Further, in search and rescue operations the movements of rescuers can be directed to better utilize the present "grid" technique in verifying that a particular geographic area has been thoroughly searched. Also, similarly in a military application troops can be observed from a central monitoring location for fast and efficient evaluation of the troops locations and relationship to each other and relationship to the operation objective and hindering terrain. The list is endless.

BRIEF DESCRIPTION OF THE DRAWINGS

The file of this patent contains at least one drawing executed in color.

| Reference Numerals | |
|---|---|
| (1) | navigation light |
| (2A) | internal antenna |
| (2B) | external antenna with clips |
| (3) | GPS receiver chip |
| (4) | DGPS chip |
| (5) | battery |
| (6) | transmitter |
| (7) | flash memory |
| (8) | download connector |
| (9) | download docking station |
| (10) | cable connector |
| (11) | computer mapping station and system software |
| (12) | printer |
| (13A) | topographical flat map |
| (13B) | ortho-rectified topographical map |
| (13C) | 3-D projection map |
| (13D) | street map |
| (13E) | tabular report |
| (14) | charging station |

PREFERRED EMBODIMENT—DESCRIPTION

Figure 1:
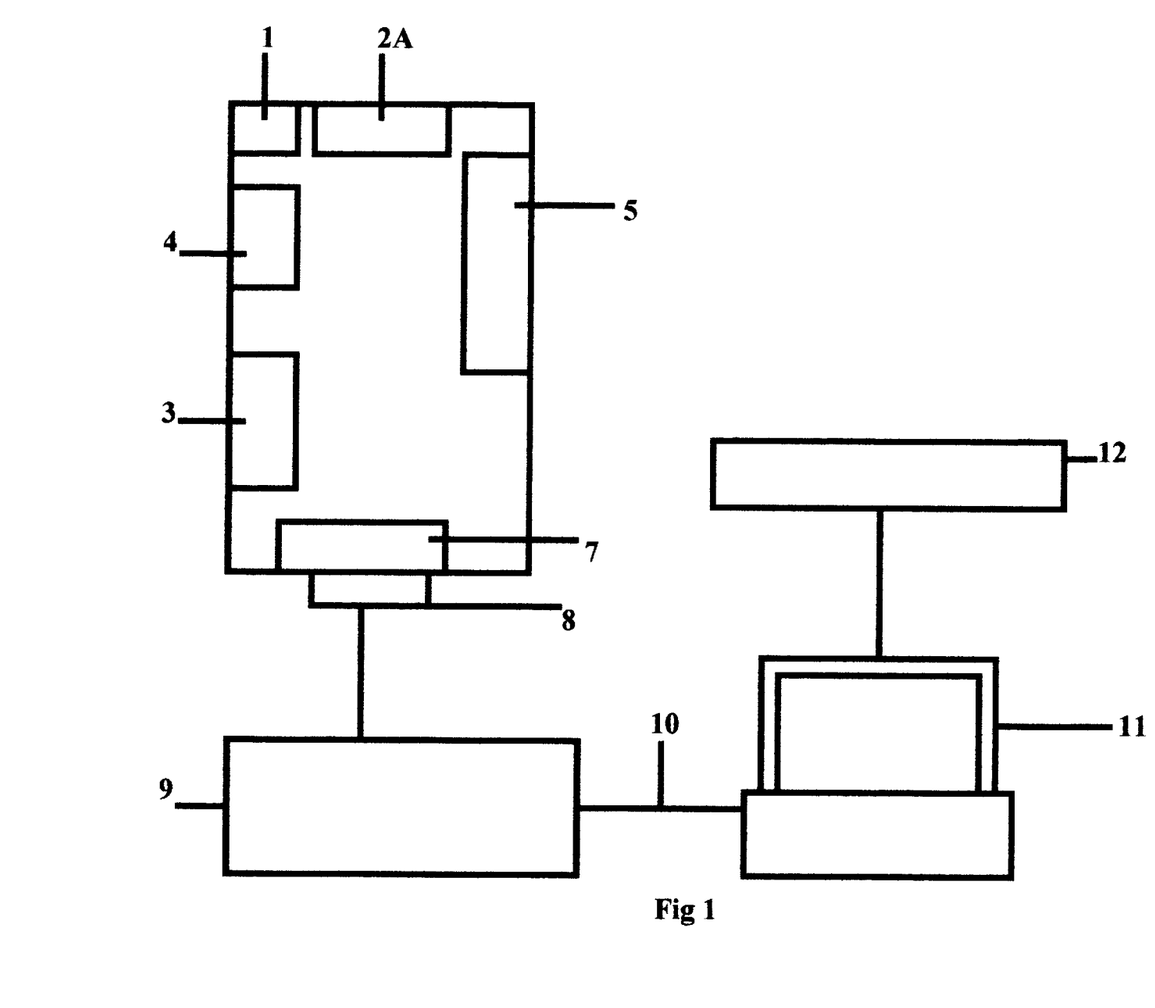
FIG. 1 is a prescriptive view of the tracking device showing the chip set, GPS board, navigation light, antenna, battery and downloading connector.

FIG. 1 is a plan view of the 5 ounce unit, pocket size tracker device as a plastic box about two inches by three inches in dimension encasing (1) a navigation light (2) antenna (3) GPS off- the-shelf chip (4) DGPS chip, (5) battery (6) transmitter (7) flash memory and (8) download connector. The download docking station (9) is connected by cable to the computer mapping station (10) transferring information to the mapping software in a computer (11) combining and sending GPS way points to a printer (12), producing maps (13A–13D) or a tabular statistics report. The tracker is then placed in the charger (9 or 14) for recharging the battery (5).

In accordance with the invention, the small plastic box is worn by an individual during outside travels or activity. The GPS off-the-shelf chip set (3) receives the GPS data through the GPS patch antenna (2), indicated when the navigation light is blinking (1) which may or may not be corrected by the DGPS chip (4) and records this data into the flash memory (7) for up to seven hours with a fully charged battery (5). The GPS data is then either transmitted to a computer mapping station via the transmitter (6) or is transferred to the mapping station through the download connector (8) to the download docking station (9) and then through the cable connector (10) to the computer (11). The GPS data is then interfaced with the mapping software (11) to produce an accurate display of the person's movements onto various maps (13) printed by a standard desk jet or laser printer (12). The tracker is then placed in the multiple charging unit (14) or in the download docking station which also substitutes as a singular charging station (9).

Figure 2:
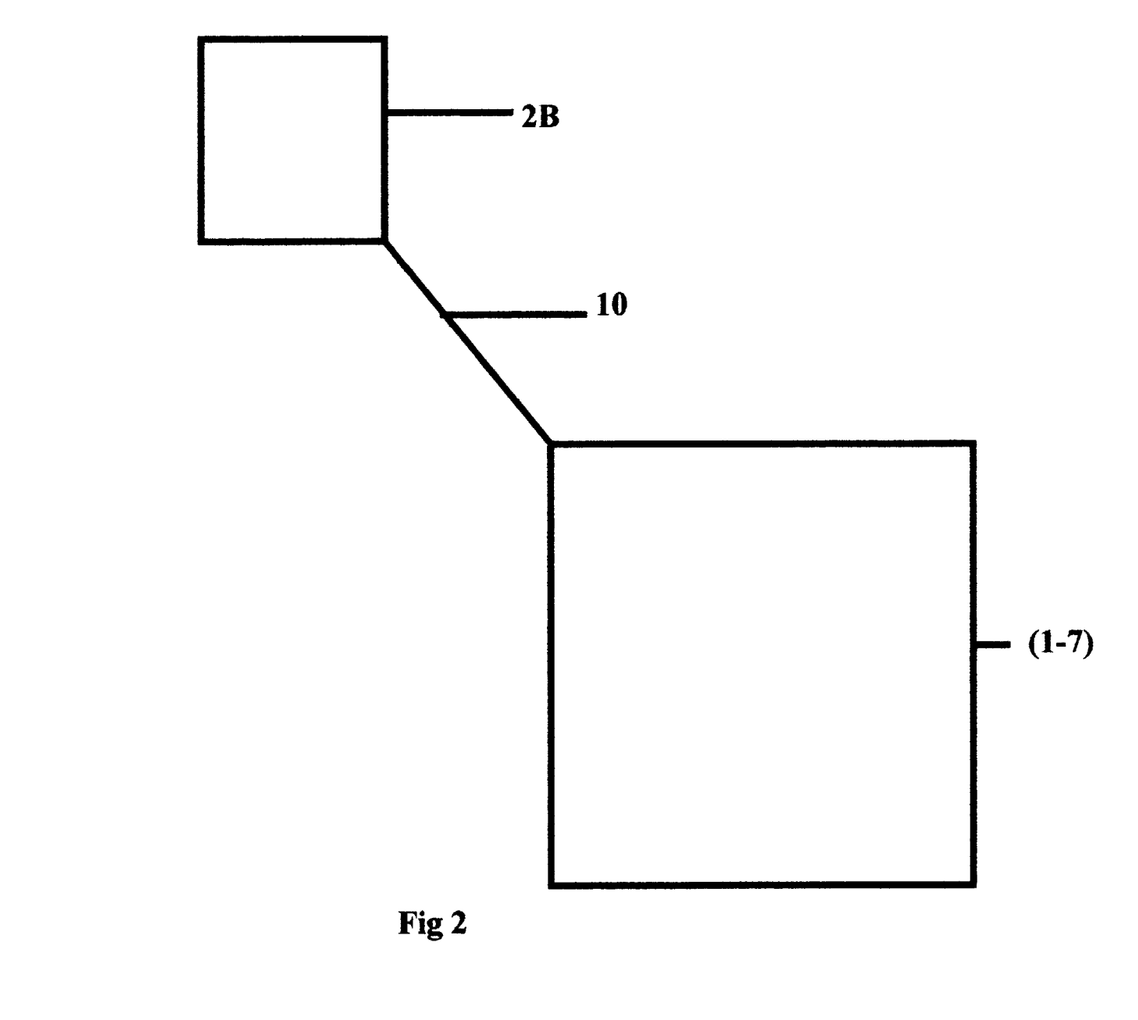
FIG. 2 is a view of my invention with an external antenna.

FIG. 2 is a plan view of the Tracker with an external patch antenna attached to the box by cable. The system works primarily the same as in FIG. 1 except the tracker unit becomes more versatile for the outdoor enthusiasts. With the internal antenna the tracker is worn in a shoulder harness to allow the positioning of the device with optimum view of the horizon. In order for the receiver in the tracker to record the GPS data it must be within line of sight of the satellites. While it is only necessary for the tracker to use 3 or 4 satellites to triangulate and thereby calculate the position correctly this can only be done with good reception and this is created by optimum positioning of the antenna. The external antenna allows the user to place the tracker box in an inside or outside pocket and position the external antenna on their shoulder by metal clips designed to affix the 1 inch by 1 inch antenna to clothing. The external antenna is also equipped with a magnetic surface which can be attached to metal surfaces such as a car roof and the tracker placed inside the vehicle.

Figure 3:
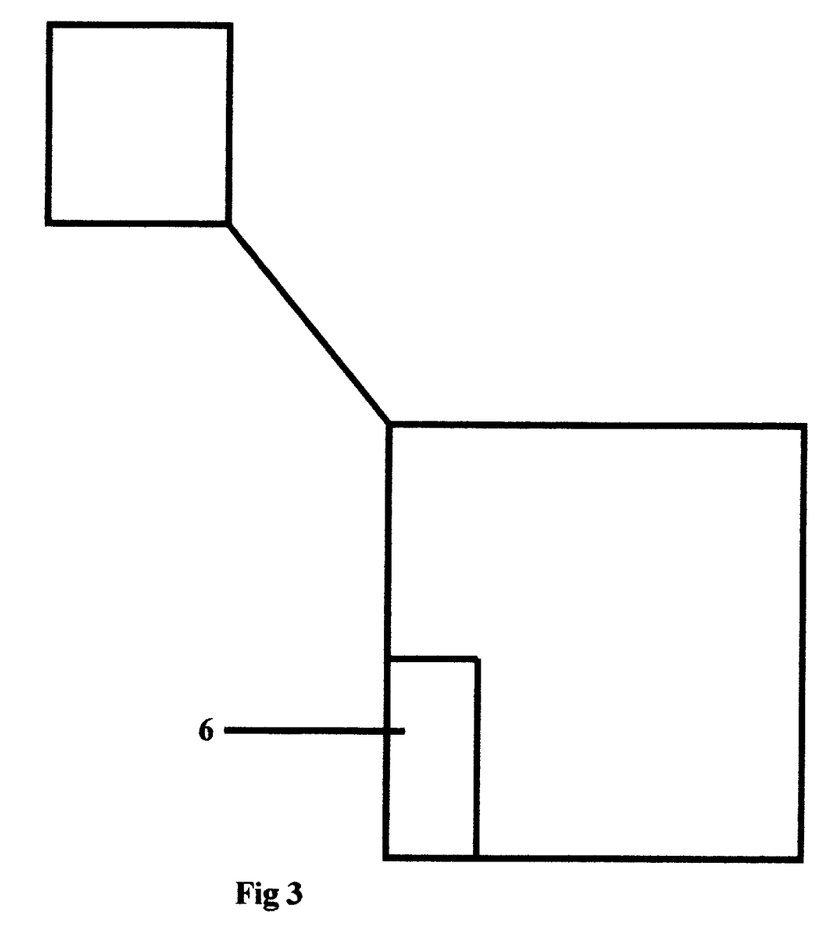
FIG. 3 is a diagram of the tracker with external antenna and transmitter.

FIG. 3 is a diagram of the tracker with an external antenna and transmitter. The transmitter may be of several kinds of technology whether radio wave based, cell phone based or paging based and will allow for the transmission of the GPS data to a remote or different location to be received by a computer monitoring station. This station can then monitor the movements of the person wearing the tracker in real time or in actuality with a minimal time delay. This will expand the uses of the tracker greatly and coupled with the mapping system software will create an ability to accurately locate individuals on a 3-D projection view of the geographic area traveled.

Figure 4:
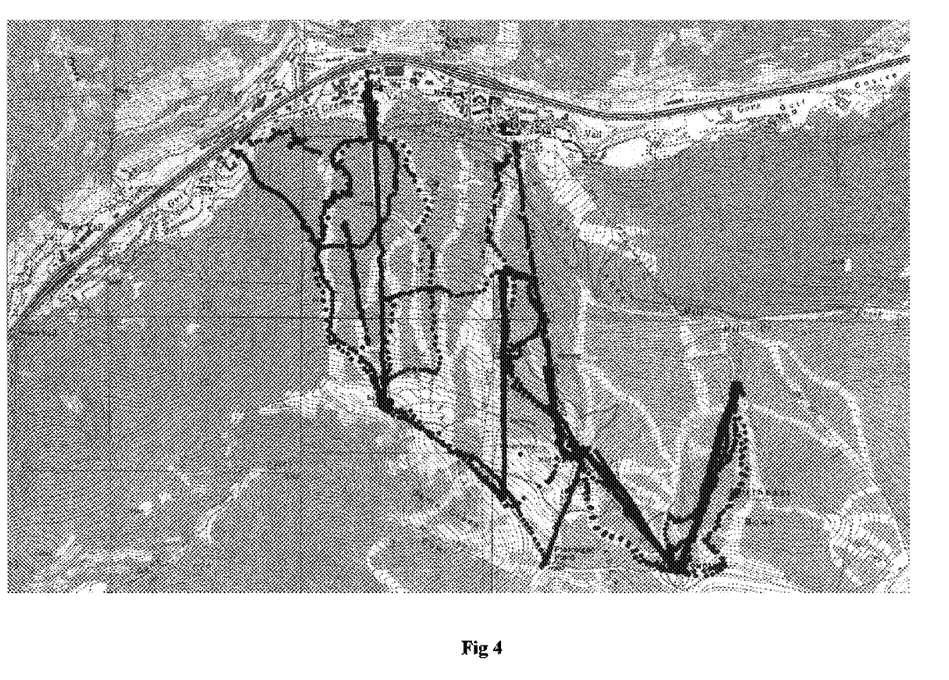
FIG. 4 is a diagram of a topographical map produced from the tracker with the mapping system software.

FIG. 4 is a sample map generated by the mapping system software known as a flat topographical map with no enhancements. The tracker unit can be used in its basic utility mode much like the GPS receivers presently on the market that are able to download the GPS data onto a map. While, this is not new technology in the field of GPS this invention has cured many of the problems associated with such use known in the existing marketed products. Namely, there has been difficulty with the amount of memory needed in the mapping program to handle the graphics for the clear and defined display of GPS data on the maps.

Figure 5:
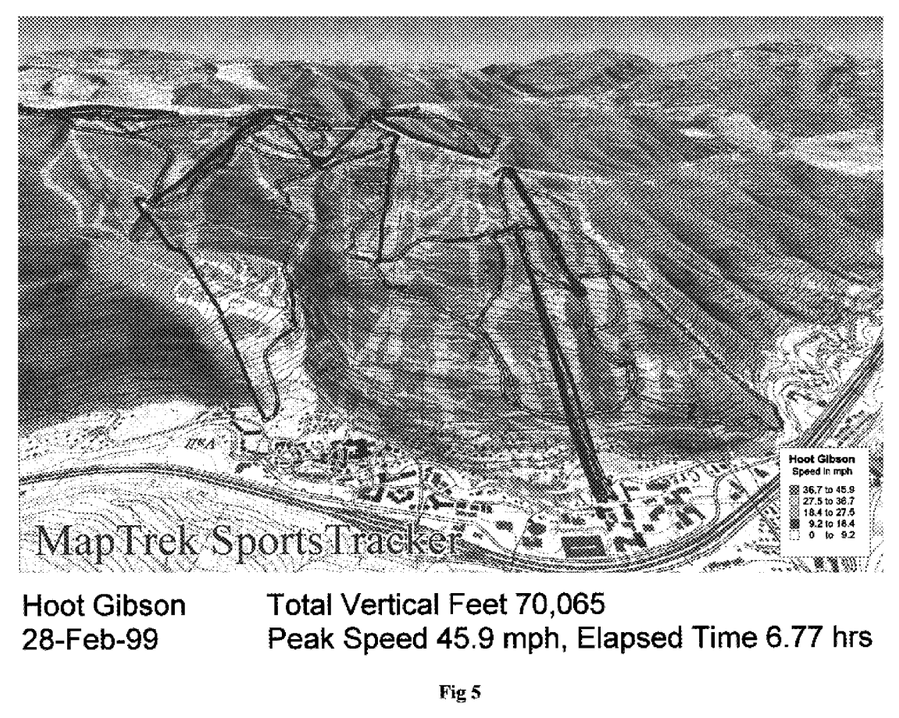
FIG. 5 is a diagram of a 3-D enhanced projection map produced from the tracker with mapping system software.

FIG. 5 is a sample map generated by the mapping system software known as a 3-D enhanced projection topographical map. This is the uniqueness of this invention. As further defined below in the operations section of this specification the mapping system software allows the accurate display of GPS data onto a 3-D enhanced projection map.

Figure 6:
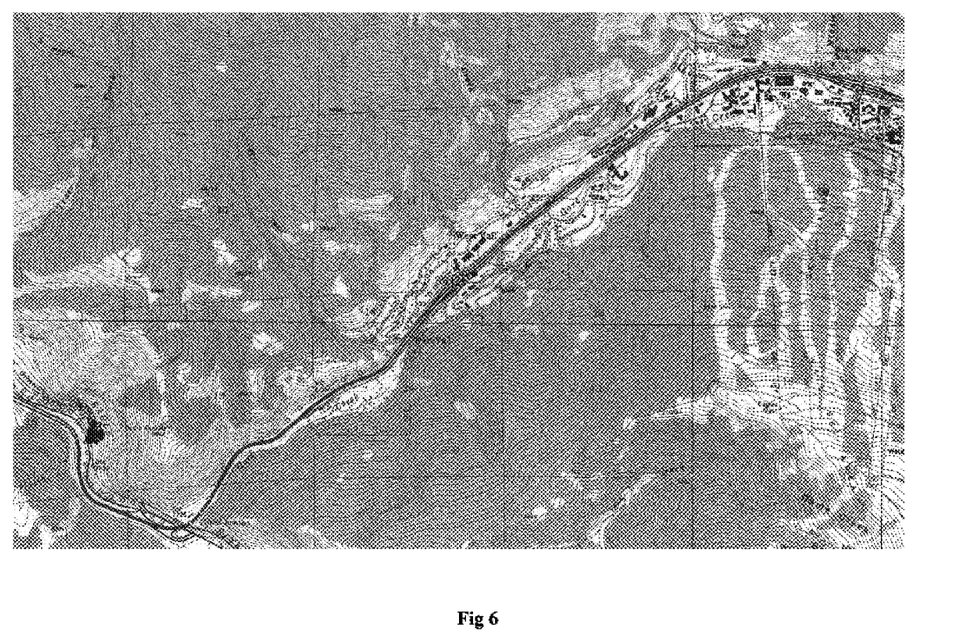
FIG. 6 is a diagram of a street map produced from the tracker with the mapping system software.

FIG. 6 is a sample map generated by the mapping system software known as a simple street map. Again, as with the basic topographical map this invention makes this process of displaying the GPS data onto basic maps easier, quicker and more accurate.

Figure 7:
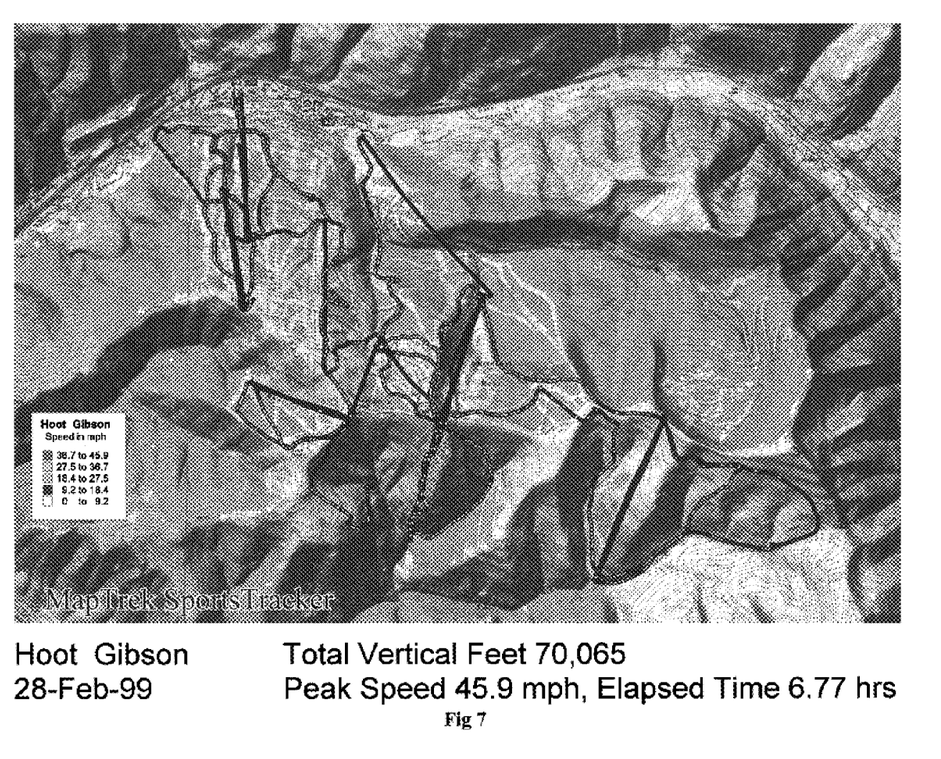
FIG. 7 is a diagram of an ortho-rectified topographical map produced from the tracker with the mapping system software.

FIG. 7 is a sample map generated by the mapping system software known as an ortho-rectified (enhanced by shading) topographical map. The use of this map is basically the same as the street and flat topographical maps. It does not take any special algorithms to do so but this map is not readily available on the market and is produced by purchasing same from any graphic artist. The flat topographical map is shaded in areas to show elevation changes. When viewing the GPS data on the ortho-rectified topographical map it is easy to discern changes in variable elevation. The viewer does not need to look closely to tell where the peaks and valleys are in the portrayed terrain. While this may not be difficult to create in the world of mapping nor perhaps a surprise to the person skilled in GPS or mapping, as yet this is the first GPS mapping apparatus willing and able to produce this map.

Figure 8:
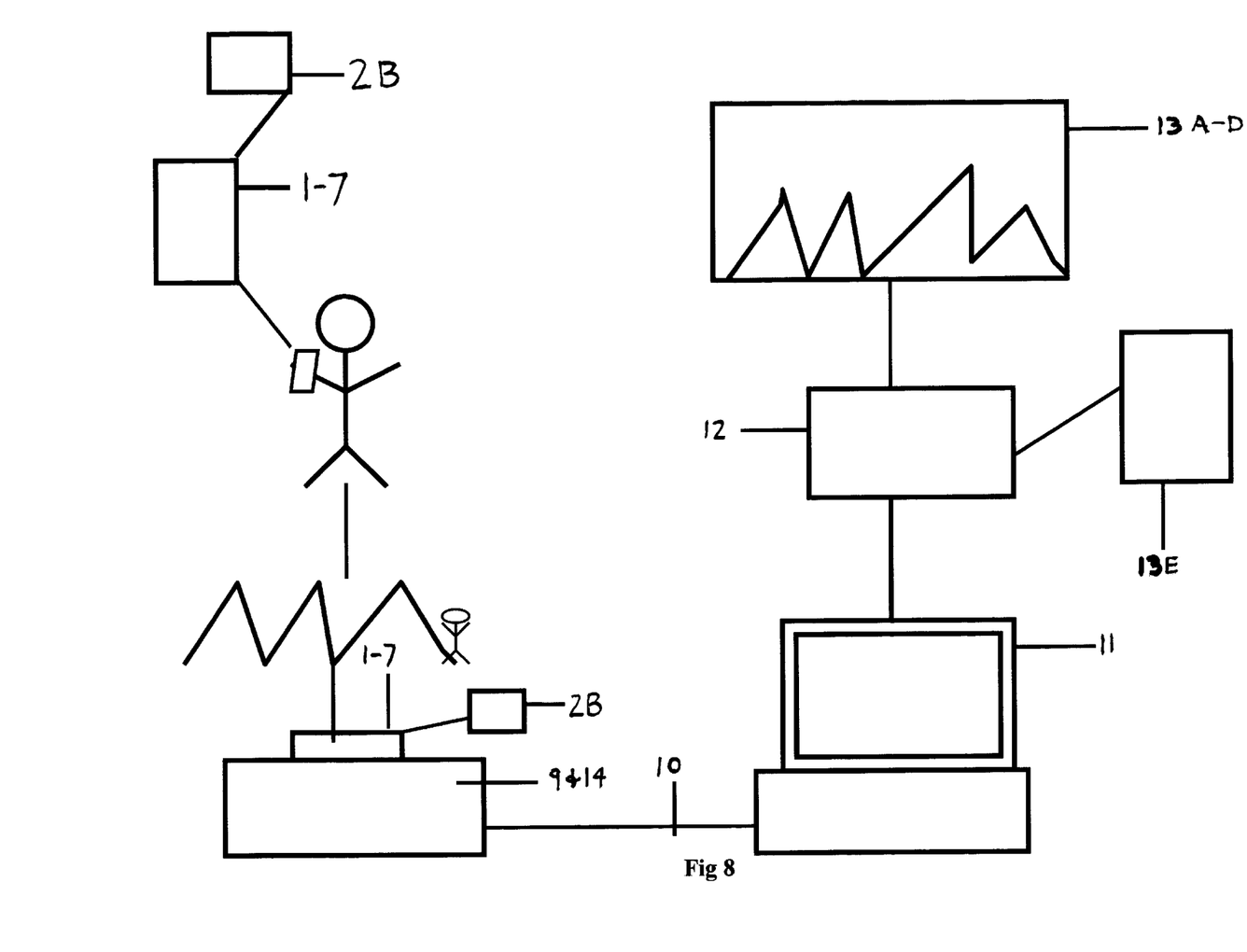
FIG. 8 is a diagram of the tracker rental process and map production.

FIG. 8 is a diagram of the tracker rental process and map production whereby a consumer/user rents the tracker for use during outdoor activities and at the end of the rental period purchases a map depicting where they traveled, total vertical feet traveled and speeds obtained. The rental of the tracker is very instrumental in bringing GPS technology to persons otherwise not involved in its use or benefits. The user does not need to own a unit nor learn all the technical information to properly program the unit with maps or coordinates to obtain useful information. The rental may be available for instance in the sport of skiing. A rental desk is positioned at the base or on a ski mountain. The user comes to the rental desk or kiosk and agrees to rent the apparatus in exchange of a rental fee. In the tracker is a point of sale system that allows the tracker to be programmed with the user name, address and payment method. A damage/theft/loss deposit is paid and the user is equipped with a tracker by placing the small box in an inside or outside pocket and clipping the external antenna to clothing at the shoulder. There is also the option of using a tracker with an internal antenna and wearing a shoulder harness that positions the tracker for optimum reception. In skiing it is best to use the external antenna due to the greater bulk in clothes worn by skiers as weather protection. The tracker is turned on as indicated by a blinking navigation light having been fully charged for seven hours of use. The average ski day can run seven to eight hours so it is necessary to have adequate battery longevity. The skier then engages in the sport of skiing by traveling over the ski mountain descending on skis and ascending on lifts. This can also be used by Nordic skiing where the ascending and descending are both done manually without the aid of ski lifts. During the ski travels the tracker records into its memory the GPS data received at certain bursts. In each sport the speed with which the person wearing a tracker travels will determine the length of the interval or burst necessary to obtain the GPS data. At the end of the ski day the user returns the tracker to the rental kiosk. The tracker is then placed in the download docking station and through the download connector on the bottom of the tracker the apparatus connects to the docking station. The mapping system software in the computer connected to the download docking station then transfers the GPS data from the tracker to the specialized software and converts the information of latitude, longitude and elevation way points into dots or bread crumbs which are then displayed on a chosen map view. The user then purchases a map personalized with their name, date, ski area name, average speeds obtained and total vertical feet traveled. Further, speed zones are portrayed on the maps with a thematic chart showing slow to fast speeds in five different charted colors. The 3-D enhanced projection map is available for the skier who wants a view of the mountain similar to a trail map or picture of the mountain. In the alternative, a skier may purchase a tabular statistics report instead of a map. The tracker is then placed in the charging station to be recharged for the next user. The charging is 85% complete in 45 minutes and trickle power charged thereafter to a full charge within 8 hours.

PREFERRED EMBODIMENT—OPERATION

The tracker is used by an individual by placing the small pocket-size plastic box in a pocket or outside harness with the antenna (internal or external) mounted for optimum exposure to the horizon as described above. The power button is on as indicated by the navigation light (1). The user then conducts their outside activity whether walking, riding a bicycle, skiing, doing search and rescue, surveillance or any type of outdoor movement. The user's movement is recorded into the flash memory (7) through the GPS receiver chip (3) for storage (7) and either immediate transmission via transmitter (6) or later transferred through the download connector (8) via the download docking station (9) and into the computer mapping station (11). The data is transferred by the mapping software (11) by post processing (processing the raw data subsequent to recordation) and plots the travels or movements of the user as GPS dots or bread crumbs via a printer (12) onto various types of maps (13) including but not limited to topographical maps, ortho-rectified maps, 3-D enhanced projection topographical maps, and street maps. For the user who does not want to purchase a map, a tabular statistics report may be purchased (13E)

This software application can portray topographical maps similarly used by other prior art GPS apparatus but in much greater detail. It provides high-resolution topographical information with very detailed contours, as low as 2 foot levels as compared to more frequently used 40 foot levels. Further, this mapping system software utilizes complicated high-resolution images unique to this invention. Also available as map choices are street maps and flat topographical maps. In addition to these is the ortho-rectified topographical map which is graphically designed using shading to produce the look of contour when viewing the map. This takes a plain topographical map and brings it to life.

As an additional product the user may purchase a tabular report rather than a map, reporting pertinent data derived from the compilation of GPS raw data including but not limited to their average speeds, peak speeds, total vertical feet ascended and/or descended or both, miles traveled with date and location noted. This can be further enhanced with calculation of vertical feet differences, adding body monitoring devices to determine heart rate and calories burned.

The mapping system software is written in MapBasic, version 4.5, which is the programming language for applications written for use with MapInfo (Troy, N.Y.) desktop mapping software. Modules are compiled individually and linked with the Project file to create the executable application. There are several unique qualities to this process embedded in the mapping system software. First is the software's ability to sort out and analyze when a skier is not traveling on the terrain surface such as when they are riding a lift. Second, is the ability to accurately display the GPS data onto a projection map where the maps latitude and longitude lines are now floating in space and third where the software uses Z-buffering to accurately portray the GPS raw data onto a map where the background remains background and foreground appears in the front. Lastly, the mapping system software has to be preprogrammed with the 3-D map view and then utilize the above methods in the event the user selects the projection map for printing and adding thereto a thematic color-coded speed chart. These techniques are described operationally separately as follows.

Above Ground: The mapping system software allows for the correct depiction of a skier riding above the terrain surface. This in the past has lead to the problem of elevation drift which can cause the raw GPS data to be displayed incorrectly on the map surface with fluctuation from 10 to 400 feet. The problem is corrected by anchoring the elevation of the user to a digital elevation model of a mountain or variable terrain at the user's X-Y location. In other words, the mapping system software tells the raw GPS data to produce dots or discernable waypoints on the map where there is a pre-programmed ski lift as follows. The software assumes the skier is always on the mountain surface. When the skier is on the ski lift and above the ground the software senses that the skier is in a sustained ascending travel. The software then knows a ski lift is involved. It allows the choice to either not print the ski lift on the map at all, showing only descending travel or to show the skier's travels along the pre-programmed line of the lift. This is accomplished by supplying the software with digitized information identified as the lift's location which is represented by a lift line and its average height. The software then uses the digitized information as to the lifts location and elevation to perform a proximity analysis with the skier's actual location revealed by the raw GPS data. The software compares the location of the skier and the known location of the lift. If the distance is within the lift location parameters and there is sustained ascending movement by the skier the software assumes the skier is on the lift and ties their location by snapping the raw GPS data to the lift line and the skier's elevation is then calculated and set as the height of the lift above the ground's surface. The GPS data as waypoints is displayed as dots or bread crumbs traveling up the lift line. On the final printed map it appears as a straight line where a lift is located.

Floating Way Points: Several equations are used to transform GPS coordinates from latitude, longitude and elevation to x-y-z coordinates on a scene's bitmap. First a set of factors are used for the coordination of the transformations including pixel values of lower and upper right corners of the map, viewed location, eye location, field of view and vertical exaggeration. Then mathematical equations are used to scale eye height and viewed height, create a vector from eye to view location, calculate direction cosines and related variable and calculate projected space scaling values and offsets. Once the initial parameters are established called operating parameters, the coordinate transform function for usage is x, y and z for input and xt, yt for output of the projected point. Using the above created equations, GPS points, as geo-coordinates X,Y and Z, are downloaded from the skier's tracker and converted into an x-y picture of coordinates and connected together as a thick line to represent the skier's tracks. There are times when a skier is outside the scene (off the map or behind a ridge) and in these situations the track is broken at the last visible point, resuming at the next point that's visible.

To achieve the correct display of GPS data on the 3-D enhanced projection map a virtual mountain data format is created. All the information for the virtual mountain data is contained in a single file followed by the elevation data. Elevations and visibility values for each view follow each grid cell. The data types (whether these are shorts, longs, single or double precession floats is determined by the view type codes. Floating point numbers are formatted to certain standards and sorted in order. To save space, elevations might be stored with an Elevation Offset and Elevation Scale applied first, so that the full precession can be carried in a smaller space. The formulas for re-creating the actual elevation for a grid cell is elevation=(Scale×Cell Elevation)+offset, so for example, if the elevation units are feet, and the offset is 12,000, and the scale is 0.1, then a cell value of 4757 would give an elevation of (0.1×4757)+12000 of 12,475.7 ft.

Grid arrays are completely populated and contain (rows× columns) cells each with the number of visibility components specified by the Number of Views field. Grid cell order starts with the SW cell and proceeds by column west to east and rows south to north. If there is no elevation data for a cell, the no-data value is used instead. Elevation and visibility offsets are considered to be at the centers of cells, but northing and easting limits include the cell edges.

Visibility offsets for each view are associated with each grid cell and there are as many of these as there are defined views. These values represent the actual vertical distance from the surface at the cell's X-Y location up to the visibility threshold as seen from the viewer's location. Positive visibilities mean the point is visible, negative ones mean its hidden from the viewer. The transformation process together with the above equations allow for the x-y coordinate to attach to the z coordinate for accurate map display.

Z-Buffering: When printing GPS data onto a 3-D enhanced projection view of variable terrain such as a ski mountain the raw GPS data must be modified to allow for accurate display where the recorded way points would otherwise create tracks on top of each other. This occurs for instance when the user skis down a gully or hill and then skis up the other side where the later side of the gully or hill is closer to the foreground of the map than where the skier first descended. This travel situation is corrected by what is known as Z-buffering. The skier's tracks farthest from the foreground of the picture are suppressed and the tracks closest to the foreground are produced. Thus, the Z-buffering process, whereby objects closest to the foreground are printed last, eliminates the incorrect placement of raw GPS data on top of each other where the projection or picture of the mountain hides certain terrain features. While this is processed using simple occlusion theories, the processing effort to calculate the correct position of objects is greatly minimized thereby resulting in much faster rendering of the projection map or mountain picture with displayed GPS data.

3-D Map Creation and Speed Chart: To more accurately understand the above technologies it is necessary to discuss the details in the algorithms used by this invention's software that produces maps of skiers' tracker from data recorded by the GPS receiver or apparatus. This invention offers several map variations provided in the software. Program initialization begins with creating the menu for the user interface. Following this the environment is checked for the presence of a file named MapTrek.ini, the file containing stored settings. If it doesn't exist, it is created and filled with default settings. The next step performs updates to the program to accommodate the changes in software versions as development proceeds. A table containing information on registered scenes is opened and the last scene viewed during the previous session is displayed. If the scenes.tab table is not found in the application's startup directory, the software assumes that no scenes have been imported and the operator is asked to import one. A scene must be registered and displayed before the software will do anything else. Finally, if a scene is successfully displayed, the application gets the data directory path name from the maptrek.ini file, checks for a table of skier's data, and if present, the menu option for displaying skier tracks in enabled. At this point the application goes into a wait state until the operator initiates action from the menu.

A scene in the context of a bitmap image representing a 3D view of the ski resort is created with various viewing operational parameters and a digital elevation model of the mountain. Information pertaining to the scenes is stored in a table called scenes.tab. Each record contains the name of the bitmap file, locations of the view from and view-to-points, field of view, and other operational parameters used to translate GPS location information on the other scenes, and the name of the elevation file that contains the surface heights and visibility information for any location on the mountain. The GPS data is downloaded from the skier's tracker and converted into an x-y picture of coordinates as described above and connected together as a thick line to represent the skier's tracks. Each segment of the line is colored based on the skier's speed at the most recent point (as recorded by the tracker). Colors that represent speed are scaled between the skier's fastest time and his/her slowest so as to have a good balance of varying colors.

CONCLUSIONS, RAMIFICATIONS, AND SCOPE

This invention thorough its apparatus and system software provides state of the art mapping techniques for interfacing with GPS recorders. The apparatus is miniaturized as compared to present available hand held devices to conveniently fit on the sport or outdoor enthusiast and provide comfort in wearing. While the apparatus differences may not be unique or unobvious, this premier unique mapping system and customized software addresses the issues and heretofore unsolved problems of GPS elevation drift and problems with recordation of raw GPS data onto a display where the user is moving above ground.

This is truly an unobvious way to solve an existing problem that is both totally surprising and fascinating to all persons skilled in the art of GPS and the field of mapping. This invention with its integrated tracking and mapping system now makes it possible to display true geochron data for 3-D viewing.

The problem of elevation drift has been corrected in the mapping system software and Z-buffering allows the accurate display onto a projection map of the raw GPS data. The final result, achieved only through this invention and system software is a picture map with accurate GPS way points gained by faster rendering on high-resolution quality maps.

By this invention, this unique GPS product and mapping system will be available to the consumer either as a daily rental or as a purchased apparatus equipped with mapping software. Now add to the post processing product the transmission of the GPS raw data to remote or different locations by a transmitter sending GPS data from the receiver to a monitoring station and monitoring people movements over varied terrain accurately depicted on a 3D projection map is available.

Accordingly, it can be seen that my invention provides an easy, user friendly, lightweight device for tracking people movements outdoors from which the recorded GPS data can be viewed on a 3-D enhanced displayed or printed map of the specific geographic area traveled. This is a fun trophy for the skier to take home from their annual ski vacation, an analytical toy for the avid runner to view travels and obtain details of miles traveled, vertical feet ascended and descended and for more scrutiny by the surveillance field agent or search and rescue team to determine where they have been and where they need to go. This, invention as to its customized mapping system integrates new technologies to produce a high-resolution topographical 3-D projection map display with very detailed contours correctly depicting GPS data as to the user's outdoor movements.

Although the description above contains many specificities, these should not be construed as limiting the scope of the invention but as merely providing illustrations of some of the presently preferred embodiments of this invention. Various other embodiments and ramifications are possible within it's scope. For example, with the addition of the transmitter the tracker may be used to determine the location of a lost child whether on a ski slope or last seen in a local park. Also search and rescue teams can finally have a tool to actually depict the areas needed to be searched rather than rely on grid techniques. Further, orienteering groups may realize the tracker as an efficient tool for faster and more accurate execution of their required travels. Thus the scope of the invention should be determined by the appended claims and their legal equivalents, rather than by the examples given.

What is claimed is:

1. A method comprising the steps of:
   (a) collecting GPS data while a person wearing the GPS recorder device is on a ski lift or engaging in similar sustained elevated ascending movement;
   (b) analyzing the data to look for sustained ascending movement and designating segments associated with ascending movement;
   (c) portraying said segments as a straight or continuous line.

2. A method comprising the steps of:
   (a) collecting GPS data while a person wearing the GPS recorder device is traveling variable terrain;
   (b) portraying said data onto a 3-D projection map whereby the latitude and longitude data way points are attached to the map by anchoring said way points at the coordinating and corresponding elevation data way points.

3. A method comprising the steps of:
   (a) collecting GPS data while a person wearing the GPS recorder device is traveling variable terrain;
   (b) portraying said data on a 3-D enhanced projection map whereby an uninterrupted line of data way points are drawn where changes in elevation between foreground and background hide some terrain and correspondingly portraying other traverse generated data in an uninterrupted line across the map where changes in elevation are viewed left to right and fully visible;
   (c) portraying the data according to subpart (b) above by analyzing the data with Z-buffering wherein the GPS way points are interfaced with map graphics.

4. A method of receiving and recording the global position of an object, comprising the steps of:
   (a) providing an object with a global positioning system recorder having GPS circuitry, control circuitry, including programming, an antenna, and a memory element;
   (b) placing operational parameters for said recorder on the memory element;
   (c) providing power to said recorder;
   (d) automatically reading said operational parameters from said memory element using said recorder, said automatic reading step controlled by said programming and performed after said providing power step;
   (e) automatically determining the position of said object with said GPS circuitry by use of a signal from GPS satellites and received by said antenna;
   (f) automatically writing said position of said object on said memory element in the form of a least one data file in accordance with said operational parameters using said control circuitry, said automatic writing step controlled by said programming and performed after said automatic reading step;
   (g) The method according to this claim, wherein said step of placing parameters on said memory element includes selecting a recording interval;
   (h) the method further comprises portraying the GPS data way points in intervals of speed and thematically color coding said intervals.

5. A method according to claim 4 wherein the GPS data is analyzed to produce a tabular report not displayed on a map or 3-D projection map view reporting the total vertical feet traveled as ascending, descending or both, miles traveled, peak and average speeds obtained, date and general location of tracking and whereby additional body monitors supplement this tabular data with heart rate and calories burned.

6. A GPS recorder, comprising:
   (a) a housing;
   (b) an antenna external of said housing and for receiving signals from a plurality of navigation satellites;
   (c) GPS circuitry inside said housing, said GPS circuitry electronically connected to said antenna, said GPS circuitry using said satellite signals to determine the position for said recorder;
   (d) a memory element positioned in said housing;
   (e) control circuitry inside said housing, said control circuitry interfacing GPS circuitry with said memory element such that operational data or parameters can be read from said memory element and position data can be written to said memory element, said control circuitry including programming that upon providing said GPS and said control circuitry with power, said programming causes said recorder to automatically read operational parameters from said memory element and then write position data to said memory element; and
   (f) means for providing said GPS and said control circuitry with power;
   (g) wherein said operational parameters includes a recording interval;
   (h) wherein operational parameters are written to said memory element at a remote location by post processing and said position data is downloaded from said memory element through a download connector, at a download docking station;
   (i) wherein the download docking station acts as a recharging station, and further connects to a PC or other computer device; and
   (j) wherein the system further comprises use of off the shelf maps enhanced with mapping system software to accurately place GPS data on a displayed map by controlling elevation drift and Z-buffering problems as set forth in the specifications.

7. The GPS system recorder according to claim 6 wherein the apparatus is sold to a consumer/user with limited mapping system software and customized maps are purchased by the user from a web site.

8. A method of renting apparatus to the consumer comprising the steps of:
   (a) apparatus charged in charging station or download docking station;
   (b) apparatus with point of sale software is programmed with users name, address, deposit and payment information;
   (c) apparatus is attached to the user whether by wearing a shoulder harness or wearing a tracker with external antenna which external antenna is affixed to the user clothing on the shoulder with clear upward view;
   (d) user engaging in ascending and descending movement over several hours of time outdoors;
   (e) user returning to the rental location and detaching antenna from clothing at the shoulder and returning apparatus for download conversion;
   (f) placing apparatus in download docking station whereby the download connector and download docking station connect;
   (g) transferring the GPS raw data from the apparatus to the mapping system software and producing a display of the raw GPS data either on a monitor or printed map utilizing the customized mapping system software.

9. The GPS system recorder according to claim 8 wherein the tracker is rented to the user and a tabular report is printed instead of a map display and purchased by the user providing statistics of travel including speeds and distance and other body functions or statistical report of data collected.

* * * * *